United States Patent
Um et al.

[11] Patent Number: 5,616,982
[45] Date of Patent: Apr. 1, 1997

[54] PIEZOELECTRIC ACTUATOR

[75] Inventors: Gregory Um, Torrance; Andrei Szilagyi, Rancho Palos Verdes, both of Calif.

[73] Assignee: Aura Systems, Inc., El Segundo, Calif.

[21] Appl. No.: 622,611

[22] Filed: Mar. 25, 1996

Related U.S. Application Data

[63] Continuation of Ser. No. 363,210, Dec. 21, 1994, abandoned, which is a continuation of Ser. No. 107,251, Aug. 16, 1993, abandoned, which is a division of Ser. No. 885,727, May 18, 1992, Pat. No. 5,260,798, which is a continuation-in-part of Ser. No. 448,748, Dec. 11, 1989, Pat. No. 5,126,836, which is a continuation-in-part of Ser. No. 429,987, Nov. 1, 1989, Pat. No. 5,150,205.

[51] Int. Cl.$^6$ .................................................. H01L 41/08
[52] U.S. Cl. ..................... 310/328; 310/365; 310/366; 310/367
[58] Field of Search .......................... 310/328, 365.36, 310/357, 367

[56] References Cited

U.S. PATENT DOCUMENTS

| | | | |
|---|---|---|---|
| Re. 20,213 | 12/1936 | Sawyer | 310/333 |
| 3,219,850 | 11/1965 | Langevin | 310/333 |
| 3,544,202 | 12/1970 | Fowler | 310/333 |
| 3,904,274 | 9/1975 | Feinleib et al. | 310/328 |
| 4,533,219 | 8/1985 | Aldrich | 310/328 |
| 4,736,132 | 4/1988 | Culp | 310/328 |
| 4,944,580 | 7/1990 | MacDonald et al. | 310/328 |
| 5,159,225 | 10/1992 | Um | 310/328 |
| 5,210,653 | 5/1993 | Schell | 310/328 |
| 5,247,222 | 9/1993 | Engle | 310/328 |
| 5,268,611 | 12/1993 | Culp | 310/328 |
| 5,281,887 | 1/1994 | Engle | 310/335 |
| 5,306,919 | 4/1994 | Elings et al. | 310/328 |
| 5,351,412 | 10/1994 | Furuhata et al. | 33/568 |

FOREIGN PATENT DOCUMENTS

| | | | |
|---|---|---|---|
| 0415657 | 3/1981 | European Pat. Off. | 310/357 |
| 3150696 | 6/1983 | Germany | 310/328 |
| 3308277 | 7/1984 | Germany | 310/328 |
| 0187980 | 11/1982 | Japan | 310/328 |

*Primary Examiner*—Thomas M. Dougherty
*Attorney, Agent, or Firm*—Anthony T. cascio; Lisa A. Merkadeau

[57] ABSTRACT

An actuator for tilting the plane of an object includes a substrate and a pair of piezoelectric material members. Each of the piezoelectric members has a top surface, a bottom surface, a first side surface and a second side surface. The bottom surface is mounted to the substrate, and the first side surfaces of each of the members are affixed to each other and electrically connected in common. One of the piezoelectric material members further has a polarization selected so that a voltage applied between the first side surface and the second side surface thereof causes the piezoelectric material member to either contract or expand between the top surface and said bottom surface, depending on the polarity of the voltage. The object is mounted to the top surface of each of the piezoelectric material members so that when a voltage is applied to one of the piezoelectric material members, the object either tilts toward or away from that member, depending on the polarity of the voltage.

8 Claims, 2 Drawing Sheets

PIEZOELECTRIC ACTUATOR

RELATED APPLICATION DATA

The present application is a continuation of application Ser. No. 08/363,210, filed on Dec. 21, 1994, now abandoned, which is a continuation of application Ser. No. 08/107,251, filed on Aug. 16, 1993, now abandoned, which is a divisional of application Ser. No. 07/885,727, filed May 18, 1992, now U.S. Pat. No. 5,260,798, which is a continuation-in-part of commonly owned, application Ser. No. 07/448,748. filed Dec. 11, 1989, now U.S. Pat. No. 5,126, 836, which is a continuation-in-part of Ser. No. 07/429,987, filed Nov. 1, 1989, now U.S. Pat. No. 5,150,205, each of which is incorporated herein by reference.

FIELD OF THE INVENTION

The present invention relates generally to optical projection systems and more particularly to a novel display projection system using, an actuated mirror array to effect modulation of pixel intensity.

BACKGROUND OF THE INVENTION

Actuated mirror arrays are useful for one component in the modulation of light intensity wherein the beam reflected from each mirror is modulated by the flux of such beam passing through a slit aperture, as disclosed in Ser. No. 07/429,987 and Ser. No. 07/448,748. As described therein, the flux is controlled by the orientation of the mirror relative to the aperture. A piezoelectric actuator has been disclosed for actuating each mirror in response to an electrical signal applied to each actuator. The electrical signal is commensurate with the degree of modulation desired. The control circuitry for the actuators has been described in Ser. No. 07/504,125, which is incorporated herein by reference. Several examples of piezoelectric actuators and mirror arrays constructed therefrom are disclosed in Ser. No. 07/494,579.

SUMMARY OF THE INVENTION

According to the present invention, an apparatus to modulate the intensity of a pixel displayed on a screen focuses optical energy from a broadband source onto a reflective first face of a planar member. The first face is disposed in said first propagation path at a selected angle thereto to direct optical energy along a second propagation path. A planar mirror is disposed in the second propagation path. The plane of the mirror is actualable to orientate the mirror within a range of angles to said second propagation path between a first angle limit and a second angle limit. A second focusing lens disposed in the second propagation path to focus optical energy reflected from the first face onto the mirror. The mirror when at the first angle limit reflects optical energy along the second propagation path to the first face and when at the second angle limit reflects optical energy along a third propagation path adjacent an edge of the planar member and external thereto so that flux of optical energy along the third propagation path is a function of the present orientation of the mirror between the first angle limit and the second angle limit. The screen is disposed in the third propagation path wherein the flux of optical energy along the third propagation path when focused on the screen determines the intensity of the pixel.

In another aspect of the present invention, a novel actuator fabricated from either piezoelectric or electrostrictive material is described.

These and other objects, advantages and features of the present invention will become readily apparent to those skilled in the art from a study of the following Description of an Exemplary Preferred Embodiment when read in conjunction with the attached

DESCRIPTION OF AN EXEMPLARY PREFERRED EMBODIMENT

Figure 1:
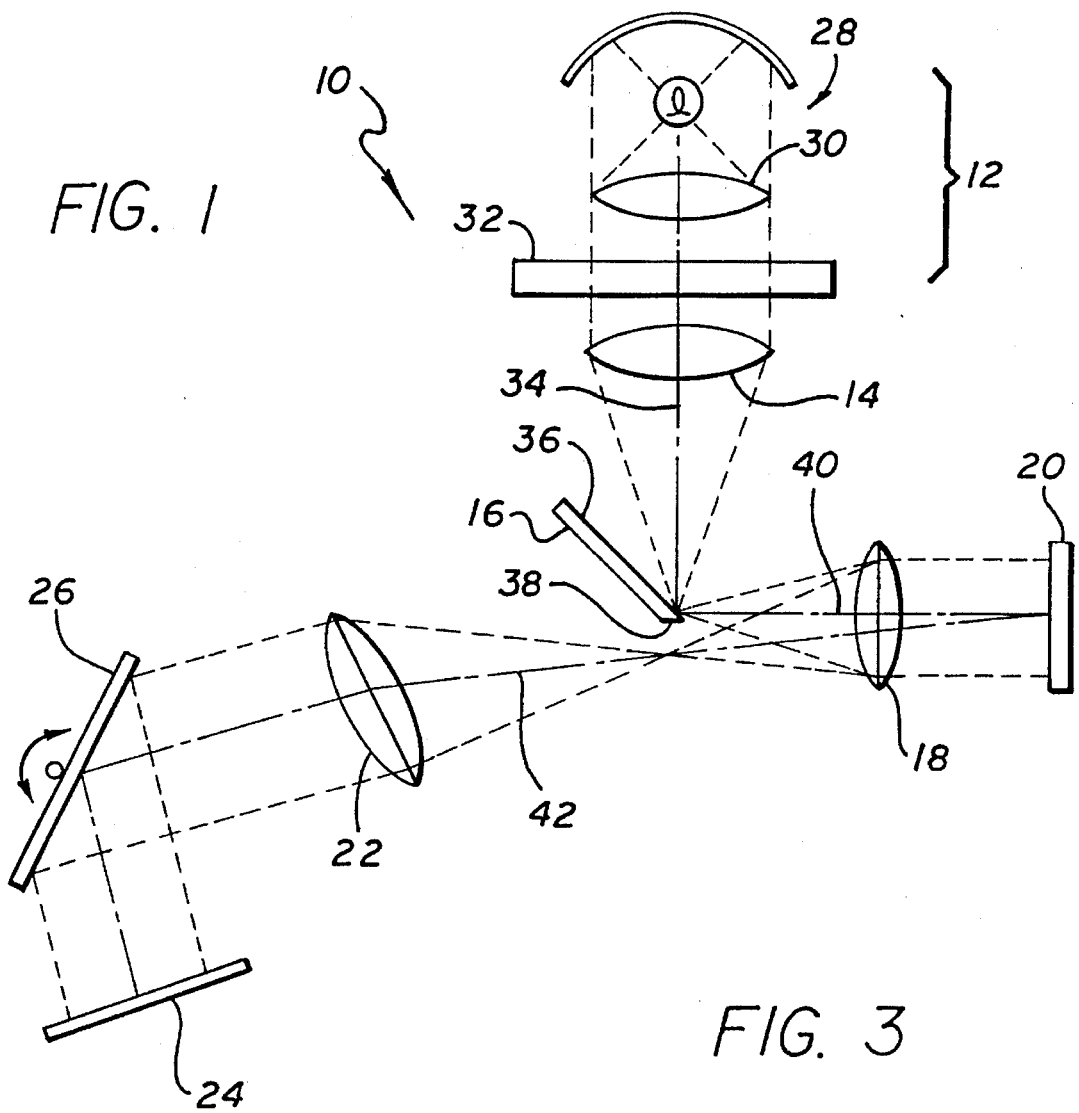
FIG. 1 is a schematic view of a novel display projection system constructed according to the principles of the present invention.
Figure 2A:
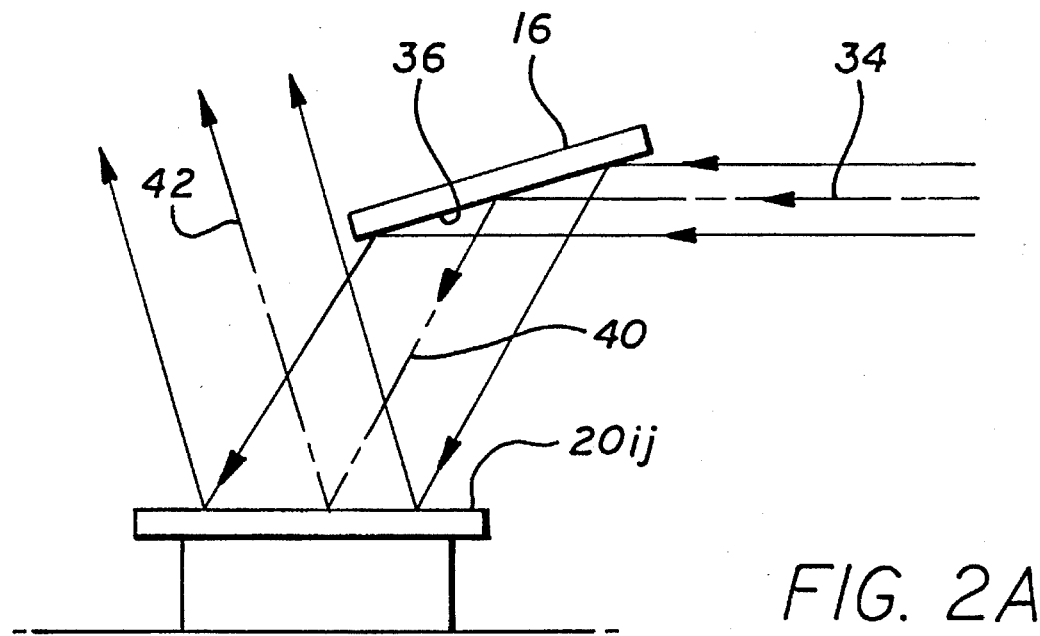
FIG. 2A is an enlarged schematic of a portion of FIG. 1.

Referring now to the FIG. 1 and FIG. 2A, there is shown a display projection system 10 constructed according to the principles of the present invention. The scene projector 10 includes a source 12 of optical energy, a first focusing lens 14, a planar member 16, a second focusing lens 18, an actuated mirror array 20, a collimating lens 22 and a screen 24. The system to may also include a scanning mirror 26.

The source 12 may include any broadband source 28 of energy. The energy may also be in the spectrum long wave infrared (LWIR) to ultraviolet (UV). The source may also include a collimating lens 30 and a filter 32. The collimating lens 30 collimares the energy from the source 28 and directs it to the plane of the filter 32. The filter 32 is useful for filtering unwanted wavelengths from the optical energy. For example for a video projector, the filter 32 may remove infrared (heat) and ultraviolet whereas if an infrared scene projector is desired, the filter 32 will remove the visible spectrum.

The first focusing lens 14 is disposed intermediate the planar member 16 and the source 12. The first focusing lens 14 focuses the optical energy emitted from the source 12 along a first propagation path 34 onto a first face 36 of the planar member 16. The point at which the energy is focused is adjacent an edge 38 of the planar member, as best seen in FIG. 1. The first face 36 of the planar to member 16 is optically reflective.

The planar member 16 is disposed at a selected angle with respect to the first propagation path 34 so that optical energy is reflected from the first face along a second propagation path 40. The optical energy along the second propagation path 40 fans out until it is incident on the second focusing lens 18. The second lens 18 collimates the optical energy along the second path. The collimated energy is then incident on the actuated mirror array 20.

With particular reference to FIG. 2A, each mirror $20_{ij}$ of the mirror array 20 is disposed in the second propagation path 40. The orientation of each mirror $20_{ij}$ determines the intensity of a respective pixel to be displayed at the screen 24. For example, if the plane of a particular mirror $20_{ij}$ is normal to the second propagation path 40, the optical energy reflected therefrom will return to the planar member 16 along the second propagation path 40. More particularly, the second lens 18 will focus the energy reflected from the mirror $20_{ij}$ surface back to its original point of incidence on the reflective first face 36. This orientation of the mirror $20_{ij}$ defines a first angle limit.

However, if the plane of the mirror $20_{ij}$ is offset from the normal to the second propagation path 40, the reflected optical energy will be along a path diverging from the second propagation path 40. This divergent energy is focused by the second tens 18 at a point offset from the original point of incidence on the reflective first face 36 so that some energy is not blocked by the planar member 16 but continues pass the edge 38. Accordingly, an increasing offset of the plane of the mirror $20_{ij}$ will decrease the flux of the optical energy returning to the original point of incidence on the first face 36 and thereby increase the flux of optical energy going past the edge 38.

When the mirror $20_{ij}$ is at its full actuated position, defining a second angle limit, none of the reflected energy therefrom returns to the original point of incidence on the reflective face 36 and all of it passes the edge 38. This energy propagates along a third propagation path 42. Therefore, the present orientation of the mirror $20_{ij}$ between the first angle limit and the second angle limit determines the flux energy along the third propagation path and hence the intensity of a pixel developed from the energy reflected from such mirror $20_{ij}$.

The collimating lens 22 is disposed in the third propagation path to eliminate the fan out of the energy along the third propagation path 42 and collimate it for display on the screen 24. The screen 24 may either display the optical energy incident thereon or be an array of photodetector elements wherein each photodetector uses the optical energy incident thereon as information for the further development of a corresponding pixel. A scanning mirror 26 may be disposed between the collimating lens 22 and screen 24 for scanning a column (or row) of pixels if the mirror array 20 is a M×1 array, where M is the number of rows (or columns). If the mirror array 20 is a M×N array, the full array of pixels is displayed and scanning is not necessary.

Figure 2B:
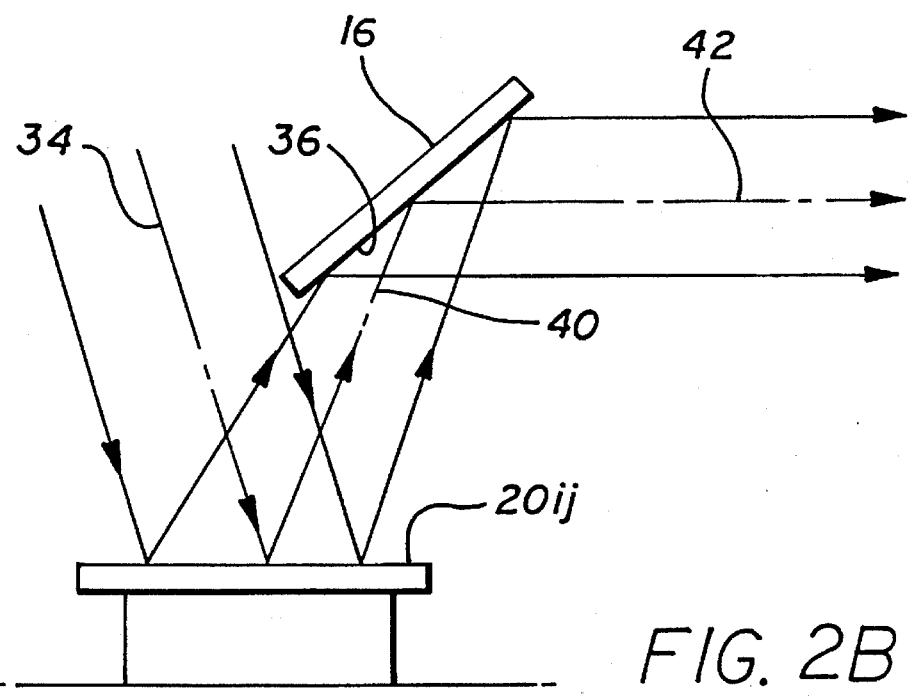
FIG. 2B is a view similar to FIG. 2A showing an alternative embodiment thereof.

Referring, FIG. 2B there is shown an alternate arrangement of the mirror array 20 and the planar member 16. The optical energy along the first propagation path is first incident on the mirror $20_{ij}$. The orientation of the mirror $20_{ij}$ at its first angle limit, normal to the first propagation path, will return the optical energy to the source. When the orientation of the mirror $20_{ij}$ is at its second angle limit, the entire flux of the optical energy will be directed along the second propagation path 40 and reflected from the reflective face 36 as a full intensity pixel along the third propagation path 42. When the mirror $20_{ij}$ is between the angle limits the amount of flux reaching the reflective face 36 is accordingly controlled for intensity modulation according to the above described principles.

Figure 3:
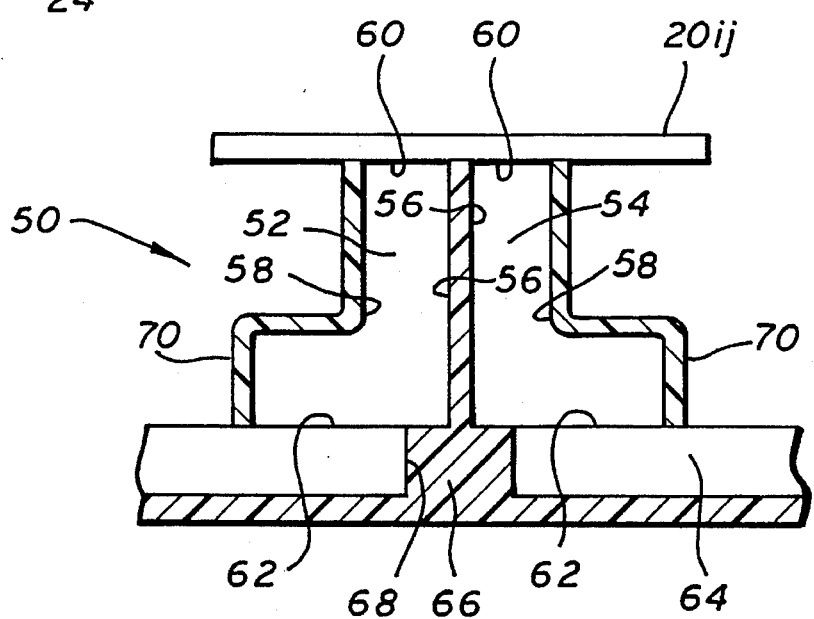
FIG. 3 is a cross-sectional view of one mirror actuator of FIG. 1.

Referring to FIG. 3, there is shown an embodiment of an actuator 50 for the mirror $20_{ij}$. The actuator 50 includes a first member 52 and a second member 54. Each member 52, 54 includes a first side surface 56, a second side surface 58, a top surface 60 and a bottom surface 62. Each member 52,54 further defines an upper region 72 and a lower region 74, the upper region 72 being proximal the top surface 60 and the lower region 74 being proximal the bottom surface 62. The bottom surface 62 of each member 52, 54 is mounted to a substrate 64. The mirror $20_{ij}$ is mounted to the top surface 60 of each member 52,54.

The first side surface 56 of each of the upper regions 72 member 52,54 are bonded face to face by a conductive epoxy which is electrically connected to electrically conductive metallization 66 along the bottom of the substrate 64 and within the via 68. The metallization 66 forms a common connection for all mirrors $20_{ij}$ in the array 20. A metallization 70 is disposed on each second side surface 58 of the upper regions 72 and isolated from each other metallization 70. The members 52,54 are formed from a piezoelectric material, including but not limited to a type of electrostrictive material. Each of the lower regions 74 of the members 52, 54 define a first width between the first side surface and the second side surface. Each of the upper regions 72 of the members 52,54 define a second width between the first side surface and the second side surface. The first width is preferably greater than said second width in order to provide stability to the mounting of the members 52, 54 to the substrate 64.

Each member 52,54 has a polarization selected so that a voltage of a first polarity applied to its second side surface 58 causes the member 52,54 to contract between its top surface 60 and its bottom surface 62. The voltage when applied to the second side surface 58 of the first member 52 causes the mirror $20_{ij}$ to tilt toward the first member 62 due to its contraction and the dimensional constancy of the second member 54. Similarly, the voltage when applied to the second side surface 58 of the second member 54 causes the mirror $20_{ij}$ to tilt toward the second member 54 due to its contraction and the dimensional constancy of the first member 52. The voltage is applied across the second side surface 58 through the metallization 70. By way of example, the first member 52 may have a selected polarity that is oriented horizontally across the width of the member. If an electric field of the same polarity is applied in the same direction between the first and second side surfaces, the member will contract in a horizontal direction. The contraction of the member in a horizontal direction will simultaneously cause the member to expand in a vertical direction, thus causing the top surface of the member to rise, and tilting the mirror toward the non-deformed second member 54.

To obtain a greater degree of tilt, the voltage may be simultaneously applied to the second side surface 58 of each member 52,65 but of opposite polarity at each side surface 58. This will cause one of the members 52,54 to contract and the other of the member 52,54 to expand. This arrangement requires that each member be piezoelectric since electrostrictive only contracts independent of polarity.

Titling may also be accomplished with one of the members being replaced by a thick layer of metallization which acts as the common connection. The voltage applied to the opposite face of the remaining member will cause the contraction or expansion, thereby causing the top surface to tilt since the metallization remains dimensionally constant.

There has been described hereinabove a novel display projection system which uses an actuated mirror array. Those skilled in the art may now make numerous uses of and departures from the above described embodiments without departing from the inventive concepts disclosed herein. Accordingly, the present invention is to be defined solely by the scope of the following claims.

We claim:

1. An apparatus for tilting the plane of an object comprising:

a substrate;

a pair of members, each of said members fabricated from a piezoelectric material, each of said members having a top surface, a bottom surface, a first side surface and a second side surface, said bottom surface being directly mounted to said substrate, and said first side surface of each of said members being affixed to each other and electrically connected in common, a first one of said members further having a polarization selected so that a voltage of a first polarity applied between said first side surface and said second side surface thereof causes said first one of said members to contract between said top surface and said bottom surface, and further wherein said object is mounted to said top surface of each of said members so that when a voltage is applied to said second side surface of said first one of said members said object tilts toward said first one of said members;

a reflective surface, said reflective surface being mounted on said top surface of said members and perpendicular to said side surfaces; and a metallization, said metallization being disposed on each of said second side surfaces of said members.

2. An apparatus in accordance with claim 1 wherein each of said members further comprise an upper region and a lower region, said lower region having a fast width between said first side surface and said second side surface and said upper region having a second width between said first side surface and said second side surface, wherein said first width is greater than said second width.

3. An apparatus for tilting the plane of an object comprising:

a substrate;

a pair of members, each of said members fabricated from a piezoelectric material, each of said members having a top surface, a bottom surface, a first side surface and a second side surface, said bottom surface being directly mounted to said substrate, and said first side surface of each of said members being affixed to each other and electrically connected in common, a first one of said members further having a polarization selected so that a voltage of a first polarity applied between said first side surface and said second side surface thereof causes said first one of said members to expand between said top surface of each of said members so that when a voltage is applied to said second side surface of said first one of said members said object tilts away from said first one of said members;

a reflective surface, said reflective surface being mounted on said top surface of said members and perpendicular to said side surfaces; and a metallization, said metallization being disposed on each of said second side surfaces of said member.

4. An apparatus in accordance with claim 3 wherein each of said members further comprises an upper region and a lower region, said lower region having a first width between said first side surface and said second side surface and said upper region having a second width between said first side surface and said second side surface, wherein said first width is greater than said second width.

5. An actuated mirror array for tilting the plane of an object in the array comprising:

a substrate;

a plurality of pairs of piezoelectric members, each of said members having a top surface, a bottom surface, a first side surface and a second side surface, said bottom surface being directly mounted to said substrate, and said first side surface of each of said members of each of said pairs being affixed to each other and electrically connected in common, a first one of said members further having a polarization selected so that a voltage of a first polarity applied between said first side surface and said second side surface thereof causes said first one of said members to expand between said top surface and said bottom surface, and further wherein said object is mounted to said top surface of each of said members so that when a voltage is applied to said second side surface of said first one of said members said object tilts away from said first one of said members;

a plurality of reflective surfaces, each of said reflective surfaces being mounted on said top surface of said members and perpendicular to said side surfaces; and a plurality of metallizations, each of said metallizations being disposed on each of said second side surfaces of said members for electrically connecting said pairs of members.

6. An apparatus in accordance with claim 5 wherein each of said members of each of said pairs further comprises an upper region and a lower region, said lower region having a first width between said first side surface and said second side surface and said upper region having a second width between said first side surface and said second side surface.

7. An actuated mirror array for tilting the plane of an object in the array comprising:

a substrate;

a plurality of pairs of piezoelectric members, each of said members having a top surface, a bottom surface, a first side surface and a second side surface, said bottom surface being directly mounted to said substrate, and said first side surface of each of said members of each of said pairs being affixed to each other and electrically connected in common, a first one of said members further having a polarization selected so that a voltage of a first polarity applied between said first side surface and said second side surface thereof causes said first one of said members to contract between said top surface and said bottom surface, and further wherein said object is mounted to said top surface of each of said members so that when a voltage is applied to said second side surface of said first one of said members said object tilts toward said first one of said members;

a plurality of reflective surfaces, each of said reflective surfaces being mounted on said top surface of said members and perpendicular to said side surfaces; and a plurality of metallizations, each of said metallizations being disposed on each of said second side surfaces of said members for electrically connecting said pairs of members.

8. An apparatus in accordance with claim 7 wherein each of said members of each of said pairs further comprises an upper region and a lower region, said lower region having a first width between said first side surface and said second side surface and said upper region having a second width between said first side surface and said second side surface.

* * * * *